March 24, 1964     L. S. JAWORSKI     3,126,038

CAGE NUT

Filed Sept. 2, 1960

*INVENTOR.*
LEONARD S. JAWORSKI
BY
*Malcolm W. Fraser*
ATTORNEY ced Mar. 24, 1964

3,126,038
CAGE NUT
Leonard S. Jaworski, Toledo, Ohio, assignor to The Bishop and Babcock Corporation, Cleveland, Ohio, a corporation of Ohio
Filed Sept. 2, 1960, Ser. No. 53,769
1 Claim. (Cl. 151—41.75)

This invention relates to fasteners for mounting in an apertured supporting panel but particularly to that class of fasteners known as cage nuts, and an object is to produce a fastener in which the nut body is deformed to provide flanges to which the spring metal cage attaches, the latter having oppositely facing hooks for panel engagement by edgewise flexing of arms to which the hooks are connected.

Figure 1:
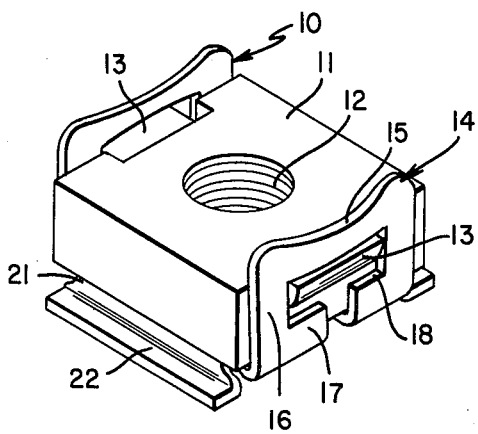
Figure 5:
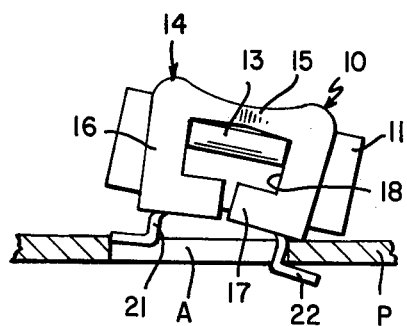
Figure 2:
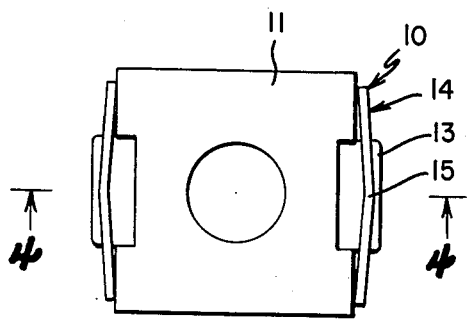
Figure 3:
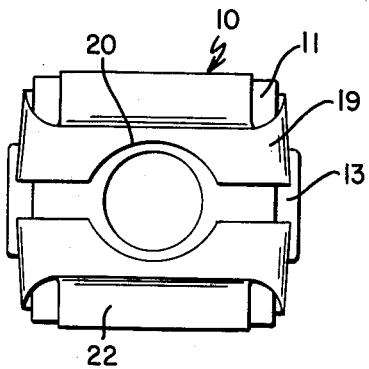
Figure 4:
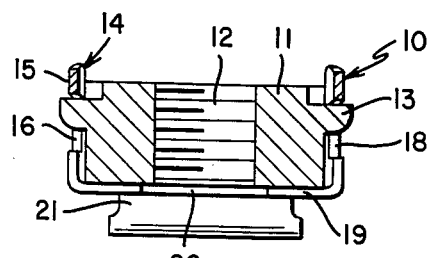

Other objects and advantages of the invention will hereinafter appear and for purposes of illustration, but not of limitation, an embodiment of the invention is shown on the accompanying drawings in which FIGURE 1 is a top perspective view of the cage nut;
FIGURE 2 is a top plan view of the cage nut;
FIGURE 3 is a bottom plan view of the cage nut;
FIGURE 4 is a vertical sectional view, substantially on the line 4—4 of FIGURE 2; and
FIGURE 5 is a side elevation of the cage nut, showing the manner in which it is applied to an apertured supporting panel.

The illustrated embodiment of the invention comprises a spring sheet metal cage 10 housing a rectangular nut body 11 which has a screw-threaded hole 12. The nut body is formed on opposite sides with integral pressed-out flanges 13 which are centrally disposed and are formed with flat upper faces. These flanges are formed by pressing the metal of the nut on opposite sides downwardly and extruding it outwardly to form the relatively thin elongate flanges 13.

The spring metal cage 10 is a one-piece construction and, as shown, is formed with a pair of vertically disposed side arms 14, one being arranged at each of the opposite sides of the nut body in the region of the extruded flanges 13. Each side arm is made up of a relatively narrow horizontally disposed strip 15, a portion of which projects above the adjacent face of the nut body and is slightly bowed in a direction outwardly of the nut body. The strip 15 is shorter than the corresponding horizontal dimension of the nut body so that the nut body projects a slight distance beyond opposite ends of the narrow strip 15. It will be observed that the upper edge of the strip 15 is downwardly curved so that the central portion is quite narrow for a purpose which will hereinafter appear. At opposite ends of the strip 15 and integral therewith are vertical narrow arm portions 16 which abut against the nut body and each of these arm portions is provided at its lower end with an inwardly extending narrow integral arm 17 also abutting flatwise against the adjacent edge of the nut. The adjacent ends of the arms 17 are spaced substantially from each other.

Integral with the lower edge portions of each of the inwardly extending arms 17 and extending at substantially right angles thereto beneath the nut body and in flatwise relation is an integral strip 19. Each of the strips 19 integrally connects the arms 17 on opposite sides of the nut body. At the inner edge of each of the integral strips 19 and disposed centrally thereof is an arcuate cutout portion 20 to accommodate the screw-threaded hole 12 of the nut body. Integral with the outer edge portion of the strip 19 and spaced inwardly from the adjacent edge portion of the nut body is an integral axially extending portion 21 which is disposed at substantially right angles to and beneath the nut body. The outwardly extending portion 21 terminates in an integral terminal portion 22 disposed at right angles to the portion 21 and cooperates therewith to form a hook-like means for engaging the inner edge portions of a panel aperture A formed in the supporting panel P for the reception of the cage nut.

It will be understood that the cage nut is applied to the panel by first inserting one of the terminal or leg portions 22 through the hole A and then flexing the other arm portion 22 inwardly to enable it to be inserted through the hole, whereby the resiliency of the metal snaps the same outwardly into hooking engagement. It will be understood that the relatively narrow strip 15 enables the flexing of the arm 16 to enable the fastener to be applied to the panel as will be readily understood. Thus the arms 17 are flexed relatively toward each other in edgewise manner to effect the application of the cage nut to the position of use. It will be observed that the flange portions 13 of the nut project freely into an aperture 18 formed in the side arms 14 of the cage, this opening being of sufficient size to enable the flexing of the arms, but sufficient to retain the cage in the applied position against the nut body.

From the above description, it will be understood that an extremely simple cage is provided for the nut body and one which employs a minimum amount of metal. The provision of the pressed-out flanges 13 in the opposite sides of the nut body enables the cage to be applied readily upon the nut body and the cage is thereby retained in place. It will be noted that each of the horizontal narrow strips 15 because of their outwardly bowed condition engages the adjacent sides of the nut body at two points, thereby facilitating the flexing of the cage when applying it to the supporting panel, the strips 15 flexing outwardly when the hook members 22 are moved relatively toward each other. In view of the simplicity of the construction and arrangement, the assembly can be produced economically in quantity production.

Although throughout this description, mention has been made of a nut body, it is to be understood that the cage can be advantageously used in connection with bolt heads where it is desired to mount the bolt on a supporting panel.

Numerous changes in details of construction and arrangement may be effected without departing from the spirit of the invention, especially as defined in the appended claims.

What I claim is:

A fastener comprising a polygonal nut body having opposite parallel sides and a top surface and a central screw threaded hole and pair of integral centrally disposed extensions projecting laterally from said opposite sides of said body, said extensions being formed with flat upper faces, a spring metal cage for said nut body, said cage having a pair of laterally spaced upright arms extending along and engaging said opposite sides of said nut and spaced radially outwardly from said top surface, said arms being free at their outer ends each of said upright arms being outwardly bowed from said nut body to facilitate flexing of the cage, a pair of laterally spaced strips integrally connecting the opposite ends of said upright arms respectively and extending across the under face of said nut body on opposite sides of the screw threaded hole, oppositely extending integral hooks on the outer edges of said strips respectively for engagement in a panel aperture, said hook portions extending in a direction substantially parallel to the nut body, each upright arm having a centrally disposed, longitudinally elongate opening into which said nut body extensions project respectively, said opening defining an upper edge which overlies said flat surface, there being a slot extending midway of said elongate opening and being of less width than said elongate opening to extend to the inner edges of said strips respectively, whereby portions of each upright arm can be flexed toward each other for enabling corresponding movement of said hooks when same are applied to the sides of a panel opening.

References Cited in the file of this patent

UNITED STATES PATENTS

| | | |
|---|---|---|
| 2,451,991 | Swanstrom | Oct. 19, 1948 |
| 2,585,728 | Bedford | Feb. 12, 1952 |
| 2,967,556 | Jaworski | Jan. 10, 1961 |